T. S. THOMPSON.
SPRING WHEEL.
APPLICATION FILED NOV. 9, 1912.

1,145,718.

Patented July 6, 1915.

WITNESSES
E. W. Callaghan
Harry J. Bossé

INVENTOR
THOMAS S. THOMPSON,
BY Munn & Co.
ATTORNEYS

COLUMBIA PLANOGRAPH CO., WASHINGTON, D. C.

UNITED STATES PATENT OFFICE.

THOMAS S. THOMPSON, OF BELFAST, MAINE.

SPRING-WHEEL.

1,145,718.  Specification of Letters Patent.  Patented July 6, 1915.

Application filed November 9, 1912. Serial No. 730,380.

*To all whom it may concern:*

Be it known that I, THOMAS S. THOMPSON, a citizen of the United States, and a resident of Belfast, in the county of Waldo and State of Maine, have invented an Improvement in Spring-Wheels, of which the following is a specification.

My invention is embodied in the form, arrangement, and attachment of flat springs which are interposed between and bolted to the inner wheel rim and the outer metal tire constituting the tread.

The details of construction, arrangement, and combination of parts embodying the invention are hereinafter described and illustrated in the accompanying drawing, in which—

Figure 1:
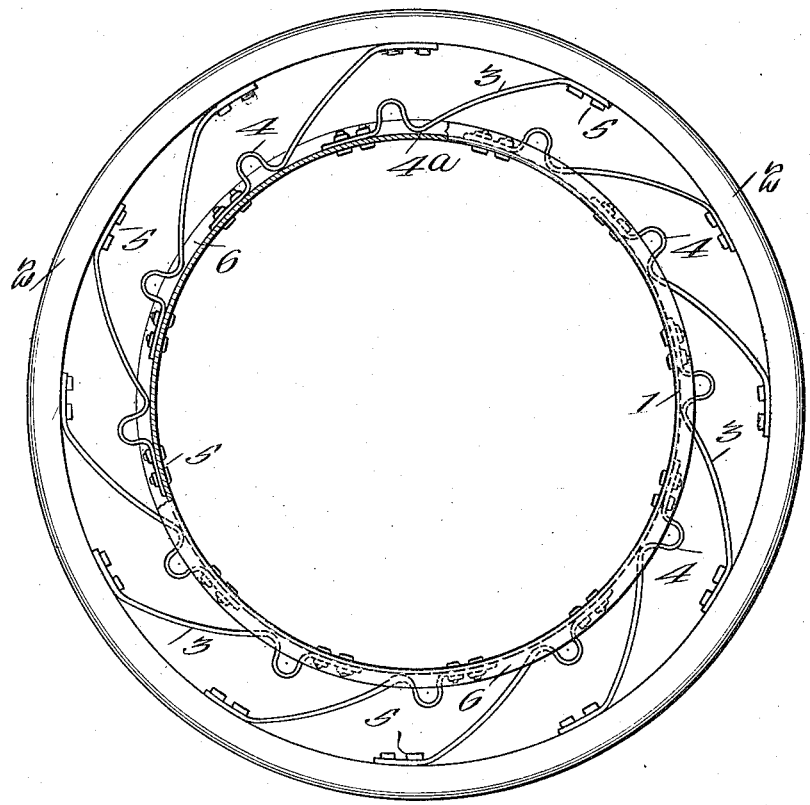
Figure 2:
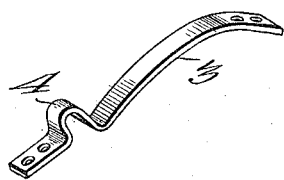

Figure 1 is mainly a side view of my improved wheel, a portion being in section. Fig. 2 is a perspective view of one of the springs.

The inner detachable wheel rim 1 and outer steel tire 2 are arranged concentrically and in the annular space between them are located the steel springs 3 whose form, arrangement, and attachment constitute the novelty of my invention. The springs are formed of thin steel plates and have two adjoining bends contiguous to their inner ends, one bend, 4, projecting outward, and the other, 4ª, projecting inwardly, while the remaining portion of the springs is practically straight and extends tangentially outward, to the tire 2 and thus constitutes practically a long elastic lever which is, however, adapted to resist thrusts and tension to the required degree. The rim 1 is provided with short radial side flanges 6 and the second or inner bends 4ª of the springs lie between these flanges which thus aid in preventing lateral deflection of the springs without affecting their elasticity. The flat form of the springs also aids in preventing lateral deflection of the rim 1.

What I claim is:—

The improved spring wheel comprising an inner rim and concentric tire, and a series of flat, steel springs attached to and connecting them, as shown, said springs having adjoining outward and inward bends contiguous to their rim ends, the remaining portion of the springs being practically straight and arranged tangentially to the rim, as described.

THOMAS S. THOMPSON.

Witnesses:
  MAURICE W. LORD,
  EDGAR F. HANSON.

Copies of this patent may be obtained for five cents each, by addressing the "Commissioner of Patents, Washington, D. C."